(12) United States Patent
Greifzu et al.

(10) Patent No.: US 12,140,411 B2
(45) Date of Patent: Nov. 12, 2024

(54) STANDARD FOR CALIBRATING A COORDINATE MEASURING MACHINE

(71) Applicant: Carl Zeiss Industrielle Messtechnik GmbH, Oberkochen (DE)

(72) Inventors: Volker Greifzu, Oberkochen (DE); Uwe Holz, Essingen (DE); Nils Haverkamp, Aalen (DE); Ulrike Zeiser, Nattheim (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 715 days.

(21) Appl. No.: 16/726,855

(22) Filed: Dec. 25, 2019

(65) Prior Publication Data

US 2020/0256662 A1    Aug. 13, 2020

(30) Foreign Application Priority Data

Dec. 28, 2018 (DE) ...................... 10 2018 133 671.3

(51) Int. Cl.
*G01B 11/00* (2006.01)
*G01B 7/008* (2006.01)
*G01B 21/04* (2006.01)

(52) U.S. Cl.
CPC ............ *G01B 11/005* (2013.01); *G01B 7/008* (2013.01); *G01B 21/042* (2013.01)

(58) Field of Classification Search
CPC .... G01B 11/005; G01B 21/042; G01B 7/008; G01C 15/06
See application file for complete search history.

(56) References Cited

U.S. PATENT DOCUMENTS

| | | | | |
|---|---|---|---|---|
| 6,067,165 A | * | 5/2000 | Matsumiya | .......... G01B 21/042 356/399 |
| 6,704,102 B2 | * | 3/2004 | Roelke | ................ G01B 11/024 356/243.4 |
| 9,372,079 B1 | * | 6/2016 | Wu | ...................... G01B 11/005 |
| 10,054,439 B2 | | 8/2018 | Jensen et al. | |

(Continued)

FOREIGN PATENT DOCUMENTS

| | | |
|---|---|---|
| CN | 104897140 A | 9/2015 |
| DE | 60211573 T2 | 9/2006 |

(Continued)

OTHER PUBLICATIONS

Backfocus Chart, DSC Labs, HollyNorth Production Supplies, Jun. 17, 2017 (Year: 2017).*

(Continued)

*Primary Examiner* — Kyle R Quigley
(74) *Attorney, Agent, or Firm* — Miller Johnson

(57) ABSTRACT

A standard for calibrating a coordinate measuring machine includes a main body with a permanent calibration structure. The calibration structure includes a first arrangement. The first arrangement is configured in such a way that three axes of a projection of the first arrangement on a plane, the axes intersecting at a common point, each run over an identically configured first portion. The first portions are each delimited by the common point on one side. The identically configured first portions each have n zones. Directly adjacent zones differ in one optical property. In various implementations, n is greater than or equal to 3.

23 Claims, 10 Drawing Sheets

(56) References Cited

U.S. PATENT DOCUMENTS

| | | | | |
|---|---|---|---|---|
| 2002/0105639 | A1 | 8/2002 | Roelke | |
| 2003/0038933 | A1* | 2/2003 | Shirley | G01B 21/042 |
| | | | | 356/243.1 |
| 2007/0239417 | A1* | 10/2007 | Alon | G06F 30/20 |
| | | | | 348/207.99 |
| 2013/0258353 | A1* | 10/2013 | Kosmecki | G01S 5/163 |
| | | | | 356/616 |
| 2014/0180620 | A1* | 6/2014 | Hicks | G01B 11/005 |
| | | | | 702/95 |
| 2017/0356736 | A1* | 12/2017 | Hoeller | G01B 21/042 |
| 2018/0372481 | A1* | 12/2018 | Stigwall | G01B 11/005 |

FOREIGN PATENT DOCUMENTS

| | | |
|---|---|---|
| DE | 102006014509 A1 | 9/2007 |
| DE | 102008025896 A1 | 11/2009 |
| DE | 102010000745 A1 | 7/2010 |
| DE | 102013014475 A1 | 3/2014 |
| DE | 102017112976 A1 | 12/2017 |
| EP | 1229303 B1 | 5/2006 |
| EP | 2312264 A1 | 4/2011 |
| WO | 2015169345 A1 | 11/2015 |

OTHER PUBLICATIONS

Jones, Calibration Checkerboard Collection, Apr. 15, 2018 (Year: 2018).*

International Standard, ISO-10360-7:2011(E), 46 pages. Jun. 1, 2011.

* cited by examiner

STANDARD FOR CALIBRATING A COORDINATE MEASURING MACHINE

CROSS-REFERENCE TO RELATED APPLICATIONS

This application claims priority to German patent application 10 2018 133 671.3 filed Dec. 28, 2018. The entire disclosure of the application referenced above is incorporated by reference.

BACKGROUND

The present disclosure relates to a standard for calibrating a coordinate measuring machine.

German publication "Prüfkörper-Überwachung von Messgeräten für die Sicherheit ihrer Messergebnisse," Carl Zeiss Industrielle Messtechnik GmbH, DE_60_020_165 I, March 2014, discloses a calibration standard marketed as ZEISS-Multisensor-Check on page 8. The ZEISS-Multisensor-Check is an apparatus for testing coordinate measuring machines with a tactile/optical sensor system. The base of the ZEISS-Multisensor-Check is formed by a rigid main body, on which very precise, calibrated material measures are applied. In particular, the test body has a glass scale corresponding to the above-described standard. The glass scale contains precise circular markings for testing a probing deviation and a graduated scale for testing a longitudinal measurement deviation.

DE 10 2010 000 745 A1 discloses a calibration pattern containing a mid-section. The mid-section includes a square bright region provided in the center of the calibration pattern and a frame pattern provided outside of the mid-section.

EP 2 312 264 A1 discloses a calibration diagram on a table. The calibration diagram includes no fewer than two non-parallel line-width patterns. The line-width patterns are disposed relative to a reference position of the calibration diagram. Each line-width pattern has a known width and height difference.

DE 10 2006 014 509 A1 discloses a test body for calibrating a coordinate measuring machine comprising at least one reference test object that has a spherical surface region.

WO 2015/169345 A1 discloses a calibration pattern on an electronic display comprising a plurality of display pixels disposed in matrix-shaped fashion. The electronic display is able to successively generate different calibration patterns in time with the aid of the display pixels disposed in matrix-shaped fashion.

DE 10 2008 025 896 A1 discloses a method for ascertaining the measurement uncertainty in geometric measurements. The method extends to coordinate and form measuring machines, preferably with visual sensors.

DE 10 2013 014 475 A1 discloses a measurement apparatus with a display device, which consists of a fixed grid of controllable elements and which generates patterns that serve as a material measure.

DE 10 2017 112 976 A1 discloses a method for calibrating an optical arrangement for determining dimensional properties of a test object. The optical arrangement contains a projector for projecting a first periodic pattern onto a projection surface within the measurement volume, and a camera for recording images of the projection surface. A first and/or a second pattern can have a periodic pattern, preferably a periodic stripe pattern, further preferably a sinusoidal stripe pattern.

International standard ISO/FDIS 10360-7 describes an acceptance and reverification test for coordinate measuring machines, in particular with image processing systems.

The known standards are not yet optimal, in particular in respect of a positioning of the standard and/or suitability for different magnifications and optical sensors.

SUMMARY

In view of this background, it is an object of the present disclosure to provide a standard of the type set forth at the outset, which facilitates a calibration with high accuracy in relation to measurement time and universal usability. In particular, a standard for use in accordance with the international standard ISO/FDIS 10360-7 is desirable.

According to one aspect of the disclosure, there is provided a standard for calibrating a coordinate measuring machine, comprising a main body having a permanent calibration structure with at least one first arrangement, wherein the at least one first arrangement comprises a plurality of adjacent zones along at least three different axes that intersect at a common point, wherein the plurality of adjacent zones along each axis of the at least three different axes form a respective portion of the first arrangement delimited by the common point on one side, wherein each axis of the at least three different axes runs over a respective portion, and wherein the respective portions each have at least three adjacent zones including at least two directly adjacent zones that differ in at least one optical property.

According to another aspect of the disclosure, there is provided a standard for calibrating a coordinate measuring machine, comprising a main body with a permanent calibration structure, wherein the permanent calibration structure comprises a first arrangement configured in such a way that three axes of a projection of the first arrangement on a plane, with the axes intersecting at a common point, each run over identically configured portions, wherein the identically configured portions each are delimited by the common point on one side, wherein the identically configured portions each have n zones, wherein directly adjacent zones differ in an optical property, and wherein n is at least 3.

By way of example, n being greater than or equal to 3 allows use of the standard for different magnifications. Furthermore, the standard can be positioned quickly and easily with respect to a coordinate measuring machine. Furthermore, the standard can be manufactured to be robust and have a long service life. In particular, the standard can be suitable for a test pursuant to ISO 10360-7.

By way of example, the standard can be a calibration standard, in particular a calibration body. The standard can preferably be an optical standard. In particular, the calibration may comprise a conversion of a pixel number into a unit of length, for example millimeters. By way of example, the calibration may comprise a determination of an accuracy of the coordinate measuring machine, for example an accuracy down to 0.025 µm. Additionally, a relative displacement between the standard and the coordinate measuring machine, for example, can be calibrated by means of the standard. Additionally, a relative displacement between the standard and the coordinate measuring machine can be monitored by means of interferometry, for example.

In particular, the standard can find use in the case of appropriate demand, for example for an annual test, in particular at a user. As an alternative or in addition thereto, the standard can find use during the production of a coordinate measuring machine.

In particular, the standard can be usable with a holding apparatus. As an alternative thereto, the standard can be usable without holding apparatus. By way of example, the standard can be used for purely optical coordinate measuring machines and/or for tactile-optical coordinate measuring machines. By way of example, a purely optical coordinate measuring machine can comprise a stereo camera system.

The main body of the standard can be configured, in particular, to span the standard in all orientations of the coordinate measuring machine. The main body can have an essentially cuboid form. By way of example, the main body can be a substrate carrier. Preferably, the thickness of the substrate carrier can be tested and/or defined in respect of a predetermined tolerance. The thickness of the standard may be between 1 mm and 30 mm, preferably between 3 mm and 10 mm, particularly preferably between 4 mm and 6 mm. The width of the standard may be between 5 mm and 100 mm, preferably between 20 mm and 50 mm, particularly preferably between 30 mm and 40 mm.

The calibration structure is a permanent calibration structure. In particular, the permanent calibration structure can be configured so as not to rely on the maintenance of a voltage. In particular, the permanent calibration structure may continue to exist without the use of a power supply. In particular, the permanent calibration structure can be a permanent calibration structure produced by means of lithography. Preferably, the permanent calibration structure can be robust in relation to relatively long storage times and/or contact. As a result of this, a permanent and easily manageable use can be ensured. In particular, the calibration can be reproducible.

By way of example, the standard may include an inscription, in particular an inscription relating to a serial number and/or a use. Preferably, the inscription is not part of the calibration structure.

The common point at which the three intersecting axes intersect can be, for example, a position of an axis of rotational symmetry of a figure that is at least partly rotationally symmetric, for example rotationally symmetric over a certain angle range, preferably through 360°. By way of example, the common point can be a center of concentrically disposed circles of the calibration structure. As an alternative thereto, the common point can be a center of a triangular ring of the calibration structure.

The axes can preferably be straight lines. The projection of the first arrangement on a plane can be imaged and/or obtained, for example, by means of imaging, in particular using light at a certain wavelength, and/or by transilluminating the standard, in particular perpendicular to the surface of the standard. The projection of the first arrangement on a plane can be the surface of the standard, for example. In particular, the standard can be used in a method where the standard is viewed from above and/or in a method where the view is through the standard. The three axes intersecting at a common point are preferably disposed in the plane, for example on a surface of the standard or a projection plane.

The first portions with identical configuration can be, in particular, portions of the projection of the first arrangement on a plane. Preferably, the first portions with identical configuration can be portions of the surface of the calibration structure. In particular, the first portions can be infinitesimally narrow portions. In particular, the axes can run over the n zones. The n zones can be defined by different optical properties.

By way of example, n can be greater than or equal to 7, in particular greater than or equal to 11, preferably greater than or equal to 13. In particular, n can be 3, 4, 5, 6, 7, 11 or 13. By way of example, a suitability for different magnifications can be increased with the number n. A large number n may increase in accuracy.

The first arrangement can be configured in such a way that more than 30 axes of a projection of the first arrangement, the axes intersecting at a common point, run over a first portion on a plane, the first portion having an identical configuration in respect of the optical properties. By way of example, four axes of a projection of the first arrangement on a plane, the axes intersecting at a common point, can run over an identically configured first portion. By way of example, the probability of identifying imaging aberrations can be increased with an increasing number of axes. The axes are preferably aligned differently in the plane.

The calibration structure, in particular the first arrangement, may comprise a first region and a second region. Preferably, the calibration structure can respectively have at least three, preferably at least ten, first regions and second regions. The first region can have a first optical property. The second region can have a second optical property. Preferably, the first optical property can be different from the second optical property. An outermost boundary line of the first region can define a first geometric shape. An outermost boundary line of the second region can define a second geometric shape. Preferably, the first geometric shape can be concentric with the second geometric shape. By way of example, the first region can be a region that is formed by a metal structure, for example a chrome structure. By way of example, the second region can be formed by a carrier structure.

Furthermore, the first arrangement can comprise a third region, wherein the third region may have a third optical property. By way of example, the third optical property can be identical to the first optical property. As an alternative thereto, the third optical property can be different from the first optical property and different from the second optical property. An outermost boundary line of the third region can define a third geometric shape. The third geometric shape can be concentric with the second geometric shape.

By way of example, the first arrangement may comprise further regions. The further regions may have further optical properties. An outermost boundary line of each region of the further regions can define a further geometric shape in each case. Each of the further geometric shapes can be disposed in concentric fashion with respect to the other geometric shapes. By way of example, the optical properties can be alternating, i.e., alternate between one another.

Geometric shapes are concentric if they have the same centroid. By way of example, two circles can be concentric in relation to one another if they have the same center. By way of example, aligning the standard with respect to the coordinate measuring machine can be simplified and/or imaging aberrations, such as distortions, for example, can be detected over large lateral regions by means of a concentric arrangement.

The first geometric shape and/or the second geometric shape and/or the further geometric shape can be selected from a group of shapes comprising a circle, a triangle or a rectangle. The triangle can be an isosceles triangle, for example. The rectangle can be a square, for example. The first geometric shape and the second geometric shape and/or the further geometric shapes can differ from one another; as an alternative thereto, they can be the same albeit with different diameters. By way of example, the first geometric shape can be the same as the second geometric shape and form concentric rings, for example.

When a circle is used as first geometric shape and/or as second geometric shape and/or as further geometric shapes, it is possible to identify a distortion, for example if one or more ellipses are detected. The evaluation and control unit can be configured to deduce a distortion and/or an incorrect arrangement of the standard in relation to the coordinate measuring machine from a shape of an imaged ellipse. By way of example, the first arrangement may comprise concentric circles. As an alternative or in addition thereto, the first arrangement may comprise an equilateral triangle disposed in a circle in concentric fashion.

By way of example, the calibration structure can comprise a second arrangement. In the case of the second arrangement, a first straight-line portion of a straight line, in particular an imaginary straight line, can have the same length as a second straight-line portion of the same straight line. The first straight-line portion can be delimited by boundary points of a first sector and the second straight-line portion can be delimited by boundary points of a second sector. Optical properties of the first sector can differ from an optical property of the second sector. By way of example, the arrangement can comprise equidistantly disposed rectangles having the optical property of the first sector. Preferably, distances between the rectangles can correspond to the width of the rectangles. By way of example, the arrangement can be a so-called zebra structure. The arrangement may comprise rectangular markers, in particular, that are aligned parallel to one another. Gaps between the markers can preferably be as wide as the markers themselves.

By way of example, the described arrangement can be used to test whether dark structures and bright structures and/or transitions from bright structures to dark structures and/or transitions from dark structures to bright structures are detected the same or a corresponding calibration is detected. By way of example, a result which can be included in further measurements using the standard, for example during measurements and/or calibrations by means of concentric circles, can be obtained within the scope of the running measurement over such an arrangement.

The main body can preferably be transparent. By way of example, the main body can be transparent to light that is used by the coordinate measuring machine. By way of example, the main body can be transparent to visible light. Preferably, the standard can consequently be used by means of a camera system of the coordinate measuring machine, both in a reflected light method and in the transmitted light method, for example for probing a bright-dark transition.

By way of example, the standard can be used with illumination, for example by the coordinate measuring machine, and/or under the use of ambient light. Universal usability can be obtained as a result thereof.

The calibration structure may comprise one or more structures selected from a structure group comprising a circle, concentric circles, a segment, a point, a triangle, a triangular ring, a rectangle, parallel rectangles with constant spacings, a grid structure, a point grid and a periodic structure.

By way of example, the circle may have a roundness of less than 0.001, preferably less than 0.0007, particularly preferably less than 0.0003. By way of example, all circles of the calibration structure and/or all rings of the calibration structure can have a roundness of less than 0.001, preferably of less than 0.0007, particularly preferably of less than 0.0003. Here, a roundness of 0.001 means that the circle lies between two concentric circles that are spaced apart by 0.001 mm.

Using one or more circles, it is possible to implement a calibration not only in one dimension but also in two dimensions, in particular without relative movement between the standard and the coordinate measuring machine. This can provide a suitability of the standard for measurements on the image and in the image. In the case of measurements on the image, a continuous displacement of the standard relative to the coordinate measuring machine is necessary in order to bring relevant regions of the standard level with the optical axis of the coordinate measuring machine. A measurement on the image usually takes a long time. By means of the described standard, it is also possible to implement a measurement in the image, i.e., a calibration without displacing the standard relative to the coordinate measuring machine. In particular, the concentric circles may have a concentricity of less than 0.1, preferably less than 0.01, particularly preferably less than 0.001. By way of example, the concentricity of 0.001 can apply to all circles and/or all rings of the standard. Here, a concentricity of 0.001 means that centers of the figures must lie within a circle with a diameter of 0.001 mm, with the circle being concentric in relation to the center. By way of example, concentric circles can be used for probing. By way of example, it is possible to draw conclusions in respect of a distortion or an imaging aberration should a circle be imaged as an oval or ellipse by the coordinate measuring machine. A plurality of concentric circles can be advantageous, particularly if different magnifications are used.

The calibration structure can have a positioning marker arrangement, for example. The positioning marker arrangement can serve to align the standard in the measurement volume, in particular in order to minimize uncertainties. In the positioning marker arrangement, the first geometric shape can be a triangle, for example, and the second geometric shape can be a circle. By way of example, the triangular ring of the calibration structure can be used to align the standard relative to the coordinate measuring machine.

By way of example, the rectangle can be a line with the line width of 0.1 mm to 1 mm, preferably 0.2 mm to 0.4 mm, with preference 0.25 mm to 0.4 mm. By way of example, the line length can be 0.5 mm to 2 cm, preferably 0.5 mm to 1 cm.

By way of example, the parallel rectangles with constant distances can have a division interval of 1 mm to 50 mm, preferably 5 mm to 15 mm, particular preferably 10 mm. By way of example, the parallel rectangles with constant spacings can be a sequence, in particular a periodic sequence. By way of example, the parallel rectangles with constant spacings can form an alternating bright-dark sequence of equal widths, for example a so-called zebra stripe pattern. By way of example, the grid structure can be a checkered structure. By way of example, the gate structure can serve to identify imaging aberrations.

By way of example, the periodic structure can be a scale, in particular a continuous scale, for example numbered from 0 to 119. In particular, the scale can be configured to calibrate a travel of a motor of the coordinate measuring machine. By way of example, the standard may comprise structures for calibrating the standard itself, for example for calibration by the Physikalisch-Technische Bundesanstalt (German National Metrology Institute).

The main body can essentially consist of a material selected from the group of materials comprising glass, quartz glass and ZERODUR®. The expression "essentially" can be understood to mean, for example, a content of 50% to 100%, preferably at least 80%, particularly preferably at least 99%. ZERODUR® is a registered trademark of Schott AG and refers to a specific lithium-aluminosilicate glass-ceramic.

By way of example, the glass can be soda-lime-float glass. Soda-lime-float glass has the advantage of being cheap and having a low and defined coefficient of thermal expansion. ZERODUR has a low coefficient of thermal expansion; however, it is not as cheap as soda-lime-float glass. Configuring the main body from glass, quartz glass or ZERODUR may be advantageous in that, in particular, these materials are transparent at the light wavelengths usually used in coordinate measuring machines. As a result, the standard is usable both in reflected light methods and in transmitted light methods.

The optical property, in particular the first optical property and/or the second optical property, can be selected from a group of optical properties comprising a reflectance, an absorbance, a transmittance and a refractive index. In particular, the reflectance can be a reflectance at a certain wavelength. In particular, the absorbance can be an absorbance at a certain wavelength. The transmittance can be a transmittance at a certain wavelength. The refractive index can be a refractive index at a certain wavelength. The reflectance can express a fraction of reflected light. The absorbance can express a fraction of absorbed light. The transmittance can express a fraction of transmitted light.

By way of example, a surface of the calibration structure can have a light scattering rate of less than 40%, preferably less than 20%, particularly preferably less than 10%. In particular, a light scattering rate can be a fraction of the diffusely scattered light. By way of example, the surface can be a surface with a first optical property. By way of example, the surface can be ring-shaped, for example a ring of concentric circles. By way of example, a low light scattering rate may increase a contrast in relation to a surface of the calibration structure with the second optical property.

The calibration structure may have a highly reflective main structure. In particular, the highly reflective main structure can be a highly reflective chrome structure with a light scattering rate of less than 40%, preferably less than 20%, particularly preferably less than 10%. In particular, the highly reflective chrome structure can be a high reflectivity chrome (HRC) structure. By way of example, an extraordinarily steepness of the edges can be generated by means of the highly reflective chrome structure in order to obtain a high accuracy of the calibration. In particular, a low scattering light rate can be obtained by means of the highly reflective chrome structure, in particular in order to improve edge definition. In particular, this can be advantageous in the case of sensors of the coordinate measuring machine that are sensitive to stray light. This can achieve a best-possible detection of probing points.

The chrome structure may have the advantage of being chemically stable and hence permanent. By way of example, the chrome structure may have been produced by means of a lithographic method, for example using photoresist coating, for example by etching, or by means of photogrammetry, for example by exposure.

By way of example, the chrome structure can have a thickness of 10 nm to 1000 nm, in particular 50 nm to 200 nm, particularly preferably 90 nm to 120 nm, possibly plus an antireflection coating. As an alternative or in addition to the highly reflective chrome structure, the chrome structure may comprise a black chrome structure, i.e., low reflectivity chrome (LRC). The highly reflective chrome structure, preferably the black chrome structure, can have an antireflection coating, for example. In the case of low reflectivity chrome (LRC), for example with an antireflection coating, the coating can preferably be configured in such a way that blue light is reflected and bothersome ambient light is absorbed.

The calibration structure may comprise stripe-shaped markers. The stripe-shaped markers can have different angles with respect to one another, for example 3° and/or 10° and/or 30° and/or 45° and/or 60° and/or 80° and/or 87° and/or 90°. In particular, the stripe-shaped markers aligned at different angles with respect to one another can serve as an angle calibration arrangement. In particular, the calibration structure can comprise one, preferably three, fan-shaped arrangements. By way of example, the calibration structure can have the three fan-shaped arrangement at different angles between the stripe-shaped markers.

The calibration structure can have an edge steepness of at least 70°, preferably at least 80°, particularly preferably at least 85°. In particular, the calibration structure can have an edge sharpness, for example in order to increase a contrast and/or an accuracy. The specifications made above may apply to all lines and/or circles and/or rings and/or letters and/or numbers.

A resolution of the standard can be increased by means of a high edge steepness. In particular, the calibration structure can have a sharply contoured embodiment by means of a high edge steepness. By way of example, the calibration structure may have a defined defect density, for example according to an inspection with a microscope, in particular a mean spacing of defects of less than or equal to 50 µm, preferably less than or equal to 10 µm, particularly preferably less than or equal to 5 µm. Distances of the edges from one another can have tolerances of, e.g., ±1 µm, preferably ±0.5 µm, particularly preferably ±0.3 µm.

An edge roughness, i.e., a deviation of the edge from straightness, for example a deviation between an upper edge and a lower edge, can preferably be less than or equal to 70 nm, preferably less than or equal to 50 nm, particularly preferably less than or equal to 30 nm. An end face planarity can be ±0.008 mm, preferably ±0.002 mm, particularly preferably ±0.001 mm. As a result of this, a constant distance can be obtained between the calibration structure and the coordinate measuring machine.

The standard can have a length of 10 mm to 1000 mm, preferably 250 mm to 350 mm, particularly preferably 290 mm to 335 mm. Particularly preferably, nominal lengths can be 300 mm, 330 mm, 500 mm or 700 mm. By way of example, this can achieve coverage of 66% pursuant to the ISO 10360 standard. It is advantageous if the length of the standard largely covers the measurement volume, for example 540 mm×35 mm×25 mm.

On the basis of their optical properties, the n zones can be subdivided into m groups of the same optical property. The sum of n and m can be greater than or equal to 5, preferably greater than or equal to 6, particularly preferably greater than or equal to 7.

The main body, preferably the entire standard, can have a coefficient of thermal expansion of $1 \times 10^{-6}/K$ to $5 \times 10^{-5}/K$, preferably of $6 \times 10^{-6}/K$ to $3 \times 10^{-5}/K$, particularly preferably $7.5 \times 10^{-6}/K$ to $9.9 \times 10^{-6}/K$. By way of example, the main body may comprise a CTE material pursuant to ISO 10360-7, in particular with a coefficient of thermal expansion of $8 \times 10^{-6}/K$ to $13 \times 10^{-6}/K$.

The calibration structure may comprise a scale. Preferably, the calibration structure may comprise two scales, for example for use for different magnifications. The scale may comprise a plurality of lines. By way of example, the two scales can have lines of different length, in particular for suitability for different objective lens magnifications. The scale may form a ruler. The scale can serve to calibrate a distance. Using the scale it is possible, in particular, to calibrate a length measurement deviation. By way of example, a position and/or distance can be calibrated by means of the scale. By way of example, the scale can serve to calibrate a translation motor of the coordinate measuring machine. The scale can be a material measure. By way of example, the standard can be used both as a length standard and as a probing standard by means of the two scales. By way of example, the scale can have continuous numbering, for example from 0 to 119.

The calibration structure can preferably be disposed in a plane. As an alternative thereto, the calibration structure can be disposed in a plurality of planes. By way of example, parts of the calibration structure can be disposed on an upper side of the main body and parts of the calibration structure can be disposed on a lower side of the main body. The calibration structure can be a planar structure. By way of example, the calibration structure can be a structure comprising the chrome structure, preferably the highly reflective chrome structure, and a surface of the main body without a chrome structure.

By way of example, the standard may comprise a main body in a cuboid form with beveled edges. The main body can be configured in such a way that a difference between minimum and maximum dimensions, for example a minimum thickness and a maximum thickness, is less than 50 µm, in particular less than 15 µm, particularly preferably less than 10 µm. By way of example, the beveled edges can be circumferential chamfers, for example with at least 0.2 mm×45°, for example at least 4 mm×45°, preferably 5 mm×45°. By way of example, the beveled edges may offer protection against cutting injuries.

A surface of the main body can be free from scratches on both sides, in particular ⅝×0.25 (ISO 10110). By way of example, the surface can be configured according to ISO 1302: August 2002. A general tolerance can be defined according to ISO 2768—mh Size ISO 14405 ISO 14405 E. By way of example, the mass of the standard can be between 0.05 and 0.5 kg, preferably between 0.1 and 0.2, particularly preferably 0.143 kg. A substrate surface deviation planarity can be less than ±0.005 mm, preferably less than ±0.003 mm, with preference ±0.002 mm. Distance dimensions of chrome edges from one another may have a tolerance of less than ±0.5 µm, preferably less than ±0.3 µm, particular preferably less than ±0.2 µm.

The standard can be configured to calibrate both a relative movement of a coordinate measuring machine with respect to a test object and an optical sensor of the coordinate measuring machine. By way of example, the relative movement can be a translation. By way of example, the standard can be configured to calibrate a length, in particular in 3-dimensional space. Preferably, the standard can be configured to calibrate a travel of the coordinate measuring machine in 3-dimensional space.

The standard can be usable for coordinate measuring machines with tactile sensors and coordinate measuring machines with optical sensors, i.e., both with imaging sensors, in particular stereo camera systems, and with non-imaging sensors. By way of example, the standard allows detection of how exactly a coordinate measuring machine can be displaced relative to a test object, for example a travel of 100 mm.

Preferably, edges of the calibration structure can be detected by a camera of the coordinate measuring machine. A measurement point can relate to the transition from "bright" to "dark"—i.e., an edge steepness.

By way of example, a probing deviation can be determined for the purposes of calibrating the optical sensor. A calibration of the probing deviation may comprise a measurement of errors of the optical sensors, for example of a camera, of the coordinate measuring machine, in particular without errors from the motor of a coordinate measuring machine, for example produced by vibrations when stopping the motor. Consequently, the standard can be both an optical length standard and a probing standard.

In particular, the calibration structure may have been manufactured at a constant temperature of between 15° C. and 25° C., preferably between 19° C. and 21° C., particularly preferably between 19.5° C. and 20.5° C. By way of example, this may also apply to letters and numbers. In particular, the calibration structure may have been manufactured at a reference temperature of 20° C. This allows a high accuracy of the calibration structure to be obtained.

The calibration structure may have structures for measuring imaging aberrations. By way of example, an imaging quality may be determined. By way of example, the imaging aberrations can be selected from a group of imaging aberrations comprising a distortion, a spherical aberration, an astigmatism, a coma, a field curvature and a chromatic aberration. By way of example, the calibration structure may comprise one arrangement, preferably two arrangements, for calibrating a relative movement between standard and coordinate measuring machine and/or one positioning marker, preferably three positioning markers, and/or a structure for calibrating a bright-dark transition and/or an arrangement for calibrating angles and/or an arrangement for detecting imaging aberrations.

The standard may facilitate a measurement in three-dimensional space. The standard may have a cost-effective configuration. The standard may be suitable for a broad spectrum of measurement tasks. By way of example, five lengths and seven orientations can be calibrated in the measurement volume by means of the standard, in particular for a 3D specification. Five lengths and four orientations in the measurement plane can be measured for a 2D specification. Five lengths and a selectable orientation can be measured for a 1D specification. The standard can be spanned and used in all orientations of a coordinate measuring machine.

This standard may comprise a plurality of first arrangements, for example at least two, in particular at least four, by preference eight first arrangements. Preferably, the standard may comprise exactly one second arrangement. As an alternative thereto, the standard may comprise a plurality of second arrangements. One of the first arrangements, preferably three first arrangements, can be used, for example, for arranging the standard relative to the coordinate measuring machine. One of the first arrangements, for example three of the first arrangements, can be used for the calibration of angles, for example. One of the first arrangements, by preference two first arrangements, can be used for detecting imaging aberrations. The second arrangement can be used to calibrate a bright-dark transition. As a result of this, a comprehensive calibration of the coordinate measuring machine can be performed by means of the standard.

It goes without saying that the aforementioned features and those yet to be explained below can be used not only in the combination specified in each case but also in other combinations or on their own, without departing from the scope of the present disclosure.

BRIEF DESCRIPTION OF THE DRAWINGS

Example embodiments of the disclosure are illustrated in the drawing and will be explained in greater detail in the following description. In the drawing.

DETAILED DESCRIPTION

Figure 1A:
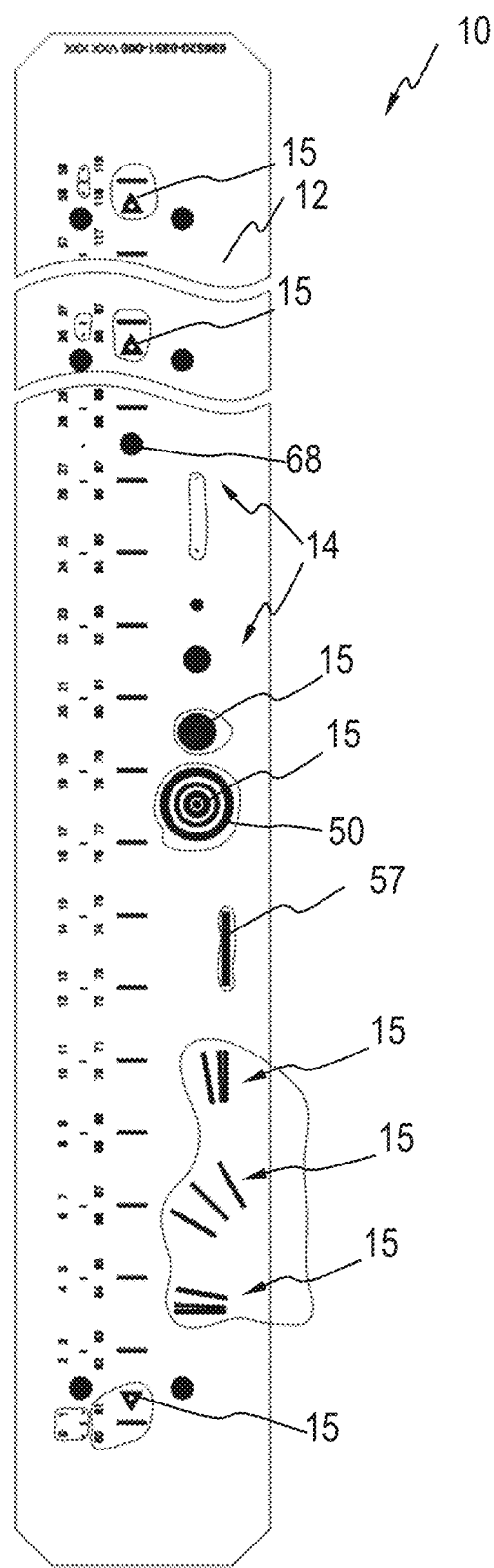
FIG. 1A shows a plan view of an embodiment of the novel standard.
Figure 1B:
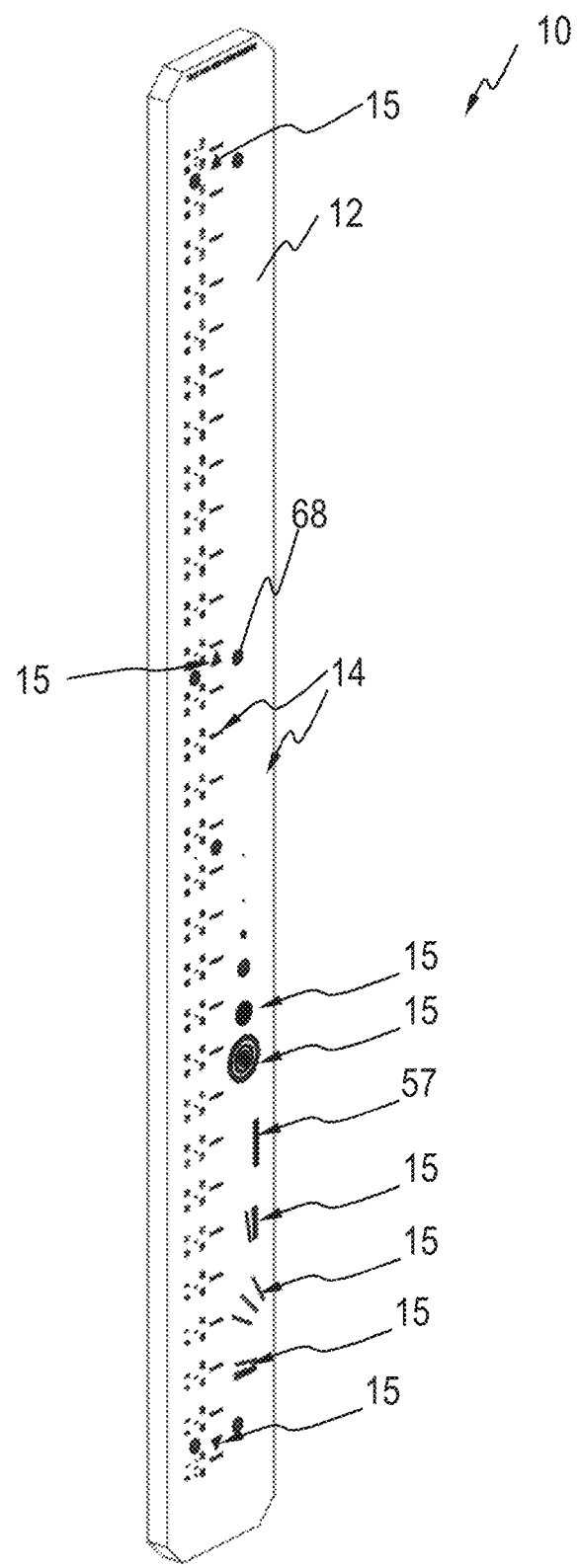
FIG. 1B shows a perspective view of the standard of FIG. 1A.

In FIGS. 1A and 1B, an example embodiment of the novel standard as a whole is denoted by the reference sign 10. FIG. 1A shows a plan view and FIG. 1B shows a perspective illustration of the standard 10. The novel standard 10, illustrated in FIGS. 1A and 1B, for calibrating a coordinate measuring machine comprises a main body 12 with a permanent calibration structure 14. FIGS. 2A, 3A, 4A, 5A, 5C, 8, 9, 10, 11 and 12 show magnified illustrations of details of the standard 10 of FIGS. 1A and 1B.

The standard 10 has a cuboid main body 12. The corners of the cuboid main body 12 are beveled, in particular to minimize a risk of injury. In principle, the standard 10 may also have a main body 12 with a different geometric configuration. Preferably, the main body 12 can have a plane surface. As an alternative or in addition thereto, the main body may also have a concave or convex surface. By way of example, the main body may also have a configuration as a cylinder or as a sphere or in lenticular fashion.

The main body 12 of the standard 10 of FIGS. 1A and 1B is elongate. The main body 12 has dimensions of 330 mm×35 mm×5 mm (length×width×thickness). In principle, the main body may also have different dimensions and different length ratios. By way of example, a ratio of length to width may be between 2 and 20, preferably between 5 and 15, particularly preferably between 9 and 10. By way of example, a ratio of length to thickness may be between 2 and 200, preferably between 50 and 100, particularly preferably between 60 and 70. In particular, this can achieve the necessary stability and/or prevent bending in the case of the non-continuous substrate and/or this can allow coverage of a sufficient length.

The standard 10 comprises a calibration structure 14. The calibration structure 14 emerges from a composition of the standard 10 from materials with different optical properties. The calibration structure 14 can be imaged by means of imaging and/or a transillumination with visible light. Imaging or transillumination allows to generate a projection of the calibration structure 14 onto a plane. The materials with different optical properties are disposed at different regions, preferably sharply delimited regions, of the standard 10. The calibration structure 14 emerges from the main body 12 and a chrome structure 68 applied to the surface of the main body 12. As an alternative thereto, the calibration structure may result in full from a construction of the main body, for example using a main body constructed from materials with different optical properties.

The chrome structure 68 of the standard 10 illustrated in FIGS. 1A and 1B was produced by means of lithography. The chrome structure 68, in particular the surface of the chrome structure 68, has a first optical property 30. The main body 12, in particular the surface of the main body 12, has a second optical property 32. The second optical property 32 is different from the first optical property 30. The surface of the chrome structure 68 has a higher reflectance than the surface of the main body 12. The chrome structure 68 is highly reflective. As an alternative thereto, the chrome structure may be made of black chrome, i.e., low reflectivity chrome. As an alternative or in addition thereto, the calibration structure may comprise a surface coating with a different metallic or non-metallic material. The chrome structure 68 of the standard 10 illustrated in FIGS. 1A and 1B has a lower transmittance than the main body 12. The main body 12 is transparent to visible light. The chrome structure 68 is opaque to visible light. On account of the different reflectances and transmittances of main body 12 and chrome structure 68, the standard 10 can be used both in the transmitted light method and in the reflected light method. Instead of the chrome structure, the standard may also have other structures, for example another metal structure, with an optical property not equal to the optical property of the main body.

The chrome structure 68 of the standard 10 is situated on the front side of the cuboid main body 12, i.e., on one of the two largest surfaces of the cuboid main body 12. As an alternative thereto, the chrome structure may be divided among a front side and a back side of the main body and/or on further sides and/or and intermediate planes of the main body, for example in the case of a layered construction of the main body. By way of example, the chrome structure can be disposed on only one or more side faces of the main body.

The front side has two scales. As an alternative thereto, the front side may have only one scale or more than two scales. The two scales are disposed along a long edge of the front side. Division lines are disposed perpendicular to the long edge. The two scales are disposed parallel to one another. The division lines of the two scales have the same spacings and lie on top of one another. As an alternative thereto, the two scales may also be disposed at an angle to one another, for example at an angle of 90°. Each scale has a plurality of division lines. The division lines are part of the chrome structure 68. The division lines are disposed in equidistant fashion. The division lines each have two opposing edges. The edges are numbered continuously with numbers. The scale disposed closer to the elongate edge, referred to as first scale below, has edges from 0 to 59. The other scale, referred to as second scale below, has edges from 60 to 119. As an alternative thereto, the scales could also be configured without numbers. The division lines each have spacings of 10+/−0.01 mm. The division lines of the first scale are shorter and thinner than the division lines of the second scale. As a result, the two scales can be used for different magnifications of the coordinate measuring machine. Both scales have a distance from the edges of the front side of the main body 12.

The calibration structure 14 comprises a plurality of arrangements, for example a plurality of first arrangements 15. The calibration structure 14 has, in each case in front of the last division lines of a scale, an arrangement, for example a first arrangement, which is configured as a triangular ring 63. With a tip, the triangular rings point in the direction of the respective last division line, i.e., on the 61st edge and on the 118th edge. The calibration structure 14 comprises a further arrangement, for example a further first arrangement 15, which is configured as a triangular ring 63. This triangular ring 63 points on the 95th edge. By way of example, the calibration structure 14 may comprise further triangular rings and/or the triangular rings can be positioned differently, at least in part. By way of example, the triangular rings 63 can serve as a positioning marker arrangement. The triangle of the triangular ring 63 is an equilateral triangle. The ring of the triangular ring 63 is disposed centrally in the triangle. The ring is disposed in concentric fashion with respect to the triangle. As a result of this, a positioning of the standard 10 relative to a coordinate measuring machine can be simplified.

By way of example an arrangement for use as a positioning marker arrangement may also have further geometric shapes or other geometric shapes disposed in concentric fashion with respect one another. By way of example, a first arrangement may comprise a plurality of concentric circles, in particular inner concentric circles, in addition to a triangle, in particular an outer triangle. As an alternative to the outer triangle, the first arrangement may also comprise an outer square. Preferably, an arrangement for positioning purposes, for example a first arrangement, may comprise an inner circle, in particular for marking a center, and an outer polygonal shape, in particular as a directional marker. By way of example, an arrangement for positioning purposes, for example a first arrangement, may comprise a plurality of shapes, in particular at least three shapes, preferably at least 10 shapes, which are disposed concentrically in relation to one another, more particularly concentric circles, and a triangle. Consequently, an arrangement, for example a first arrangement, can serve both as positioning marker arrangement and for the detection of imaging aberrations. By way of example, the concentric circles can have an equidistant embodiment, in particular in order to detect a difference between a bright-dark transition and a dark-bright transition in addition to the positioning function.

Respectively opposing points are disposed at the two corners of the triangular rings 63 that do not point at an edge. Together with the triangular rings 63, these can serve for positioning purposes.

The calibration structure 14 comprises arrangements for an angle calibration, which are configured as first arrangements, for example. The standard 10 comprises three arrangements for an angle calibration. The three arrangements for the angle calibration each have three stripe-shaped markers 70. The stripe-shaped markers 70 have different angles with respect one another. In each of the arrangements for angle calibration, the stripe-shaped markers 70 are disposed on a graduated circle and point to the center thereof. As an alternative thereto, an arrangement for angle calibration, for example a first arrangement, could comprise more than three stripe-shaped markers, for example at least six, preferably at least nine, particularly preferably at least 15 stripe-shaped markers. The stripe-shaped markers can be aligned on a center of a circle. In particular, the first arrangement could comprise stripe-shaped markers disposed on a ring, for example as in the case of a scale of an analog clock. The three arrangements for angle calibration are strung together at one end of the front side of the standard 10 along the longitudinal side. As an alternative thereto, the arrangements for angle calibration could also be disposed at another position of the standard. By way of example, the standard could comprise more than three, for example more than 10, or fewer than three arrangements for angle calibration, for example merely a fan-like arrangement of markers.

Figure 9:
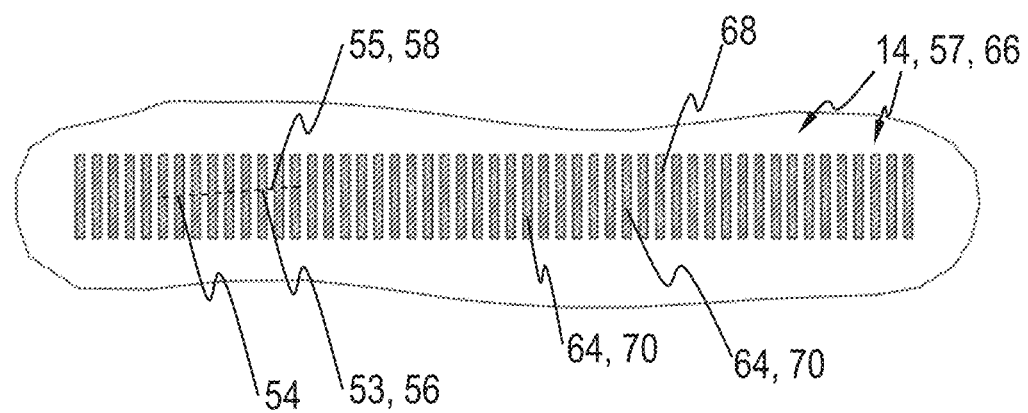
FIG. 9 shows a magnified portion of a second arrangement of the standard of FIGS. 1A and 1B.
Figure 10:
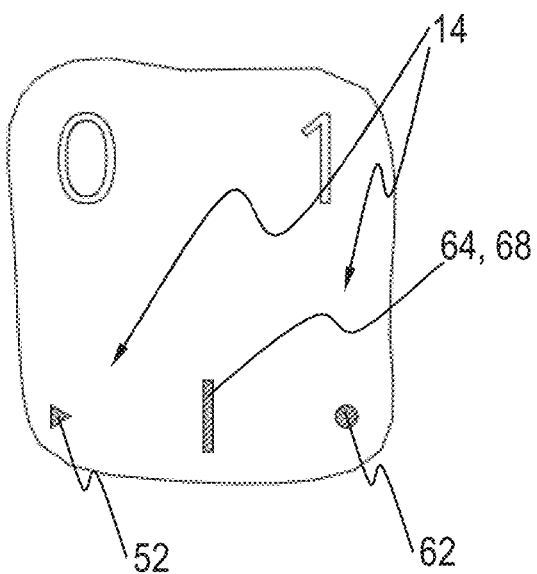
FIG. 10 shows a magnified portion of a further part of the calibration structure of the standard of FIGS. 1A and 1B.
Figure 11:
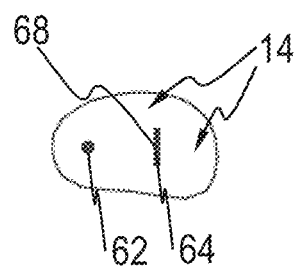
FIG. 11 shows a magnified portion of a further part of the calibration structure of the standard of FIGS. 1A and 1B.
Figure 12:
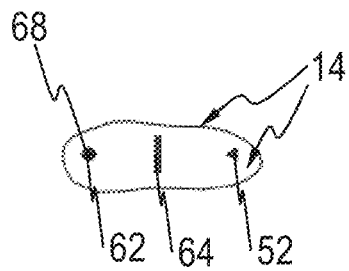
FIG. 12 shows a magnified portion of a further part of the calibration structure of the standard of FIGS. 1A and 1B.

The standard 10 has a marker arrangement for detecting a difference between the detection of a bright-dark transition and a dark-bright transition, which is illustrated in magnified fashion in FIG. 9 and which may also be referred to as second arrangement 57. The standard 10 has 51 stripe-shaped markers 70 that are disposed equidistantly from one another. The width of at least a part of the stripe-shaped marker 70 corresponds to the distances to directly adjacent stripe-shaped markers 70. In principle, the standard may comprise a different marker arrangement for detecting a difference between the detection of a bright-dark transition and a dark-bright transition. By way of example, this marker arrangement may comprise more or fewer than 51 stripe-shaped markers, for example only 2 or 3. By way of example, the calibration arrangement may comprise a first arrangement with at least three, preferably at least 10, particularly preferably at least 50 concentric circles, with the radii of the rings increasing incrementally, with the increment being at least partly constant. As an alternative thereto, the standard may have a number of squares, for example two squares, wherein the side lengths of the squares are the same as the gaps between the squares.

The calibration structure 14 comprises two first arrangements 15, which are configured as arrangements comprising a plurality of concentric circles. The calibration structure 14 comprises a first arrangement with 10 concentric circles and a first arrangement with 12 concentric circles. The innermost point has no chrome structure 68 in each case. The outermost ring has a chrome structure in each case. The concentric circles can serve for detection of imaging aberrations, in particular for different magnifications. As an alternative or in addition thereto, the standard could comprise arrangements with concentric polygons, in particular at least 5 concentric polygons, for example concentric squares or concentric triangles.

The calibration structure 14 comprises four strung together points with decreasing diameters. The two arrangements with the concentric circles and the four strung together points are disposed along the longitudinal side of the front side of the main body. The points are part of the chrome structure 68. As an alternative thereto, the calibration structure 14 could comprise more or fewer than four strung together points with decreasing diameters. By way of example, the standard could comprise points with different diameters and/or rings with different diameters that are not strung together, at least in part.

The calibration structure 14 comprises a point, the center of which is disposed on an imagined straight line with the centers of the two triangular rings 63. The point can serve for positioning the standard 10. The point is disposed between the 87th edge and the 88th edge of the second scale.

Next to the 0th edge, the calibration structure 14 comprises an equilateral triangle. A tip of the equilateral triangle points to the 0th edge. A point is disposed laterally from the 1st edge of the first division line of the first scale. Centers of the equilateral triangle, of the first division line and of the point are disposed along an imaginary straight line. An arrangement made of a point, the last division line of the first scale and an equilateral triangle, the arrangement being mirror symmetric with respect to the above, is situated at the other end of the standard. A tip of the equilateral triangle points on the 59th edge. Both arrangements can serve for positioning the standard. The point and the equilateral triangle can each serve as a marking of the outermost division lines. The described parts of the calibration structure 14 are illustrated in magnified fashion in FIGS. 10 and 12.

Disposed between the 35th edge and the 36th edge are a large point and a small point. The small point at the 36th edge is illustrated in magnified fashion in FIG. 11. Both points can serve for positioning and/or orientation.

Disposed between the 27th edge and the 28th edge of the first scale is a line parallel to the division lines. Disposed between the 87th edge and the 88th edge is a point. As an alternative or in addition thereto, points and/or triangles and/or triangular rings and/or other geometric shapes can be disposed at other positions of the standard, in particular for positioning the standard and/or as milestones for when scanning the standard by means of a coordinate measuring machine.

Figure 2A:
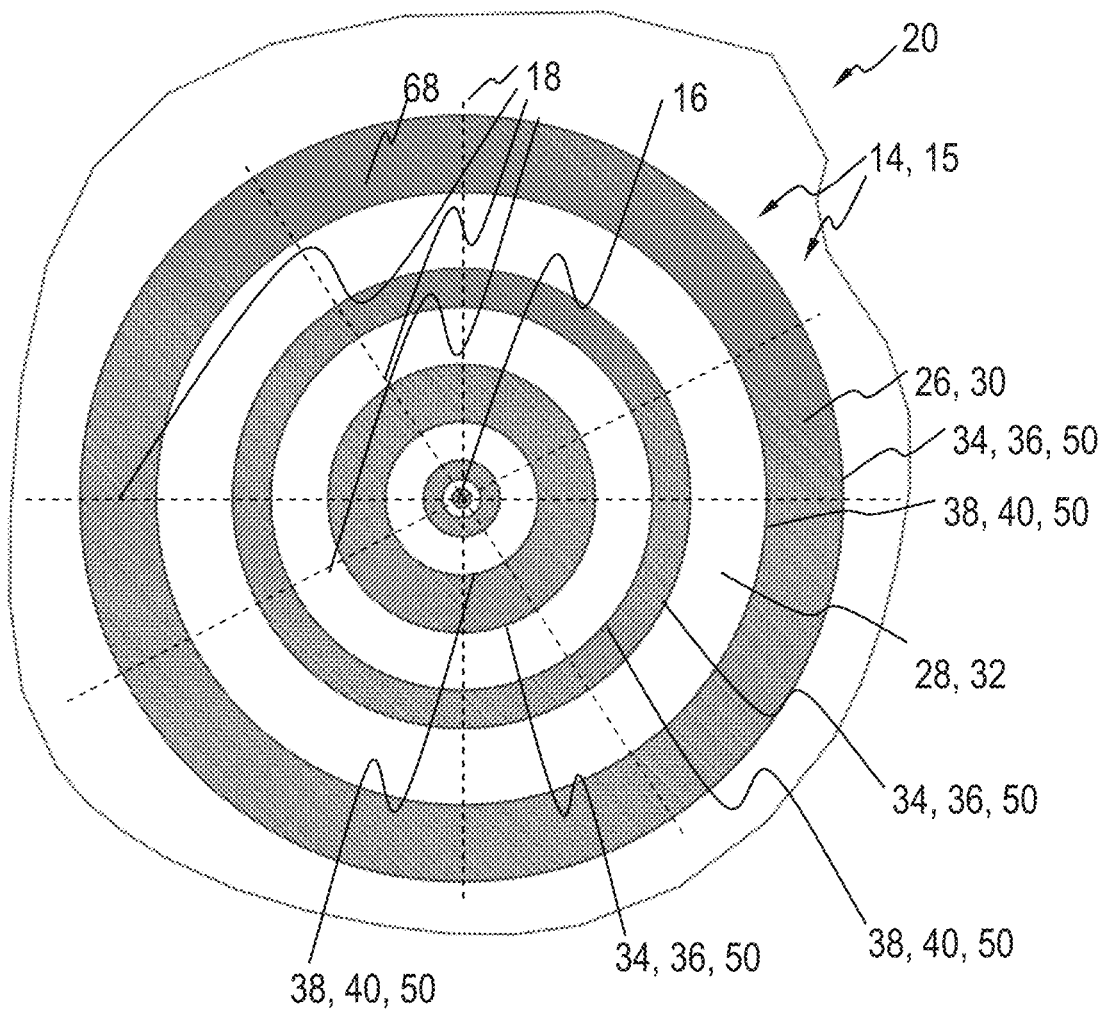
FIG. 2A shows a magnified portion of a first arrangement of the standard of FIGS. 1A and 1B.

The calibration structure 14 comprises a first arrangement 15. The first arrangement 15 is configured in such a way that three axes 18 of a projection 20 of the first arrangement 15 on a plane, the axes intersecting at a common point 16, each run over an identically configured first portion 22. FIG. 2A even shows four axes 18 of a projection 20 of the first arrangement 15 on a plane, the axes intersecting at a common point 16, that each run over an identically configured first portion 22. In particular, FIG. 1A shows a projection 20 of the first arrangement 15 onto a plane.

The standard 10 has an inscription at one end of the front side. The inscription can serve to identify the standard.

The standard 10 according to FIGS. 1A and 1B has a plurality, preferably eight, first arrangements 15, in which in each case three axes 18 of a projection 20 of the respective first arrangement 15 on a plane, the axes intersecting at a common point 16, each run over identically configured first portions 22, as illustrated in FIGS. 2A, 2B, 3A, 3B, 4A, 4B, 5A, 5B and 5C.

Figure 2B:
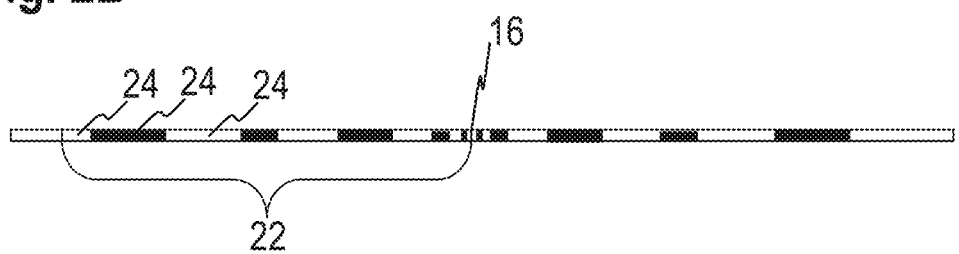
FIG. 2B shows an illustration of a first portion of the first arrangement illustrated in FIG. 2A.

The first portions 22 are each delimited by the common point 16 on one side. FIG. 2B shows such a first portion 22, which is delimited on one side by the common point 16. The identically configured first portions 22 each have n zones 24. Directly adjacent zones 24 differ in one optical property. n is greater than or equal to 3.

In the first arrangement 15 of the novel standard 10 illustrated in FIGS. 2A and 2B, n=11. In the first arrangement 15 of the standard 10 of FIGS. 1A and 1B illustrated in FIGS. 3A and 3B, n=13. In the first arrangement 15 of the standard 10 of FIGS. 1A and 1B illustrated in FIGS. 4A and 4B, n=3. In the first arrangements 15 of the standard 10 according to FIGS. 1A and 1B illustrated in FIGS. 5A, 5B and 5C, n is likewise equal to 3. In the first arrangement 15 of an example embodiment of a novel standard 10 illustrated in FIGS. 6A and 6B, n=7. In the first arrangement 15 of a further example embodiment of a novel standard 10 illustrated in FIGS. 7A and 7B, n=3.

The first arrangement 15 can be configured in such a way that more than three axes 18 of a projection 20 of the first arrangement 15 on a plane, the axes intersecting at a common point 16, run over an identically configured first portion 22. The first arrangement 15 illustrated in FIG. 2A has infinitely many axes 18 that intersect at a common point 16, the axes running over an identically configured first portion 22. This results from the rotational symmetry of the concentric circles 50 of the first arrangement 15 according to FIGS. 2A and 2B.

Figure 3A:
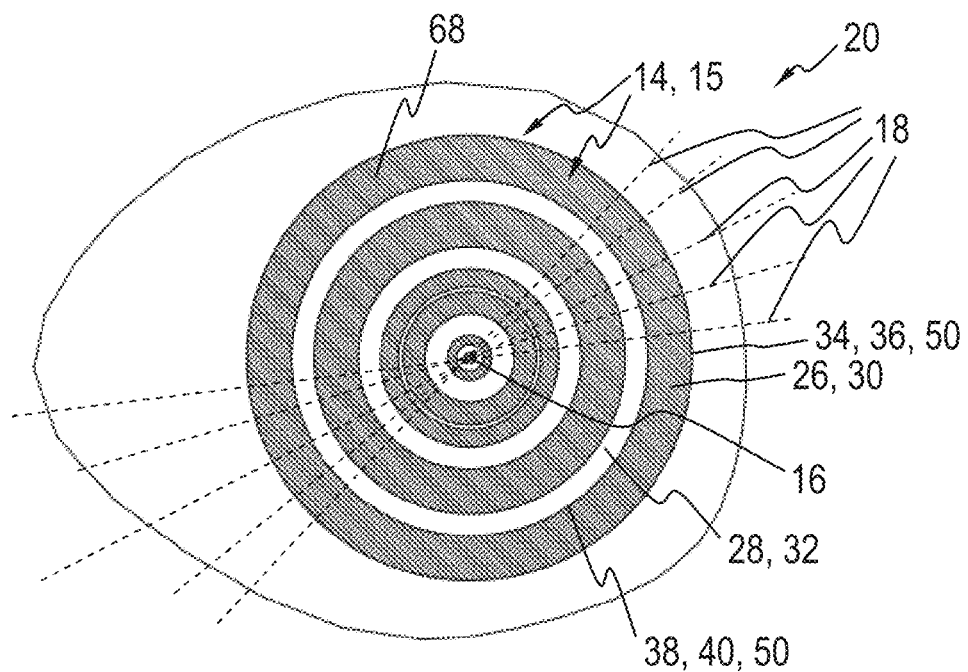
FIG. 3A shows a magnified portion of a further first arrangement of the standard of FIGS. 1A and 1B.
Figure 3B:
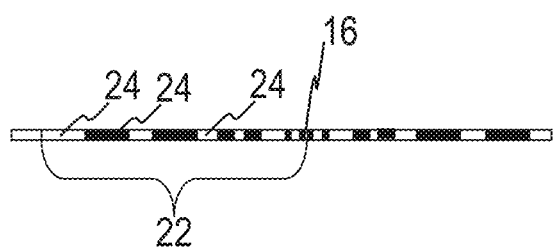
FIG. 3B shows an illustration of a first portion of the first arrangement illustrated in FIG. 3A.
Figure 4A:
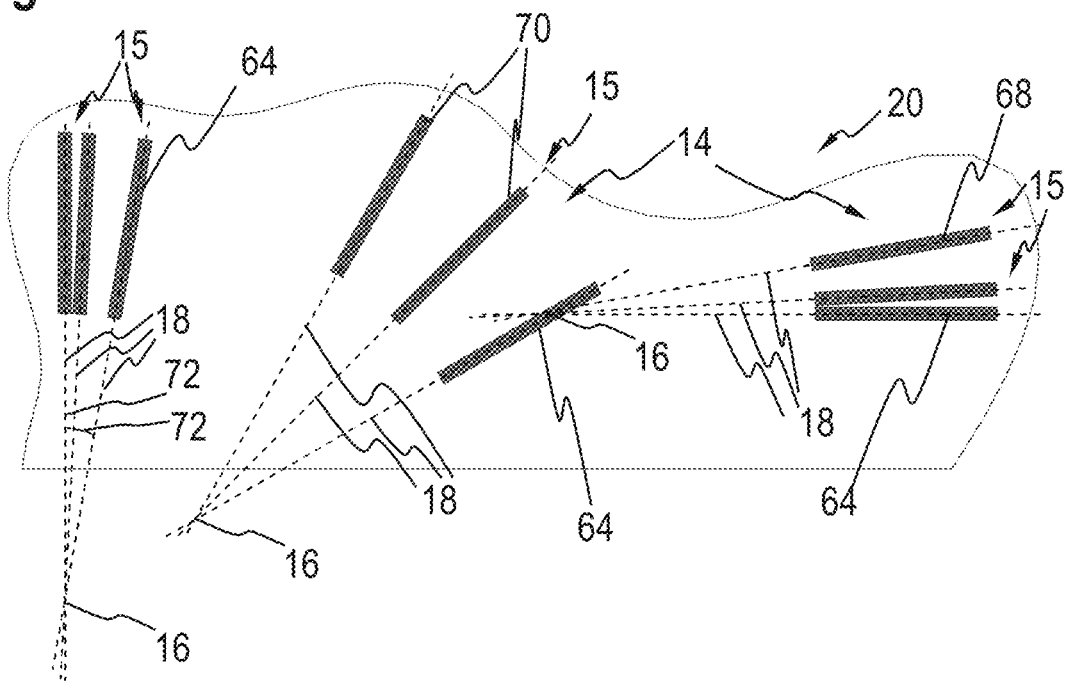
FIG. 4A shows a magnified portion of a further first arrangement of the standard of FIGS. 1A and 1B.
Figure 4B:
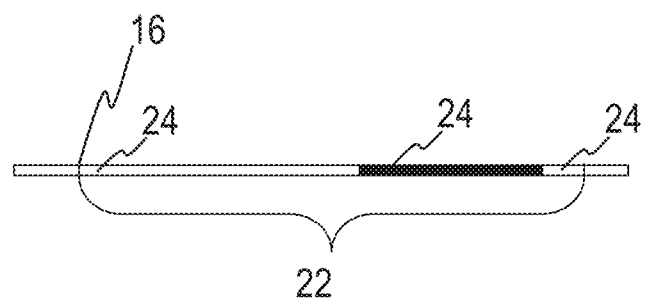
FIG. 4B shows an illustration of a first portion of the first arrangement illustrated in FIG. 4A.

The first arrangement 15 of FIGS. 3A and 3B likewise has infinitely many axes 18 of a projection 20 of the first arrangement 15 on a plane, the axes intersecting at a common point 16 and running over an identically configured first portion 22. Only five of these axis 18 are plotted in FIG. 3A in example fashion. FIG. 4A shows three first arrangements 15. Each of these first arrangements 15 has exactly three axes 18 that intersect at a common point 16, the axes running over an identically configured first portion 22. The same also applies to the first arrangements 15 illustrated in FIGS. 5A and 5C; this likewise applies to the first arrangements 15 according to FIGS. 6A and 7A.

The first arrangement 15 can comprise a first region 26 and a second region 28. The first region 26 can have a first optical property 30. The second region 28 can have a second optical property 32. Preferably, the first optical property 30 can be different from the second optical property 32. The first region 26 can have a chrome structure 68 as the surface and the second region 28 can have the surface of the main body 12. An outermost boundary line of the first region 34 defines a first geometric shape 36. An outermost boundary line of the second region 38 defines a second geometric shape 40. Preferably, the first geometric shape 36 can be concentric with the second geometric shape 40. The first geometric shape 36 illustrated in FIG. 2A is a circle 50. The second geometric shape 40 in FIG. 2A is also a circle 50. The first arrangement 15 illustrated in FIGS. 2A and 2B has, disposed concentrically with respect one another, ten first geometric shapes 36 and second geometric shapes 40, in this case circles 50. The first arrangement 15 according to FIGS. 3A and 3B has 12 geometric shapes 36, in particular 12 circles 50 that are disposed concentrically with respect one another. The first arrangements 15 illustrated in FIGS. 5A, 5B and 5C have, as a first geometric shape 36, a triangle 52 and, as a second geometric shape 40, a circle 50, just like the first arrangement 15 according to FIGS. 7A and 7B.

In the second arrangement 57 of the calibration structure 14 illustrated in FIG. 9, a first straight line portion 53 of a straight line 54 has the same length as a second straight line portion 55 of the same straight line 54, wherein the first straight line portion 53 is delimited by boundary points of a first sector 56 and the second straight line portion 55 is delimited by boundary points of a second sector 58. Preferably, an optical property of the first sector 56 differs from an optical property of the second sector 58. The second arrangement 57 according to FIG. 9 is particularly suitable for the comparison of bright-dark transitions and/or dark-bright transitions. The second arrangement 57 may comprise rectangular markers 64, in particular, that are aligned parallel to one another. Gaps between the markers are preferably as wide as the markers themselves. By way of example, results of a measurement by means of the second arrangement 57 can be taken into account in calibrations by means of the first arrangements 58 and/or a scale. This can increase an accuracy.

Figure 5A:
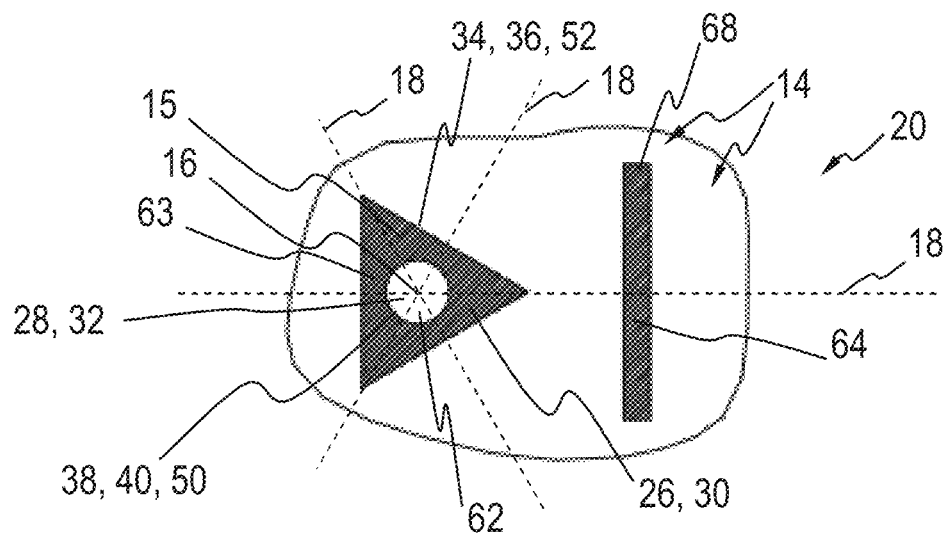
FIG. 5A shows a magnified portion of a further first arrangement of the standard of FIGS. 1A and 1B.
Figure 5B:
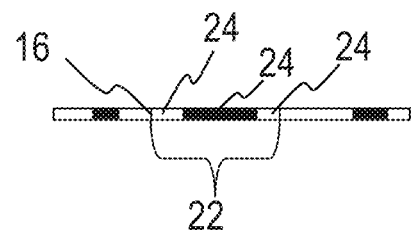
FIG. 5B shows an illustration of a first portion of the first arrangement illustrated in FIG. 5A.
Figure 5C:
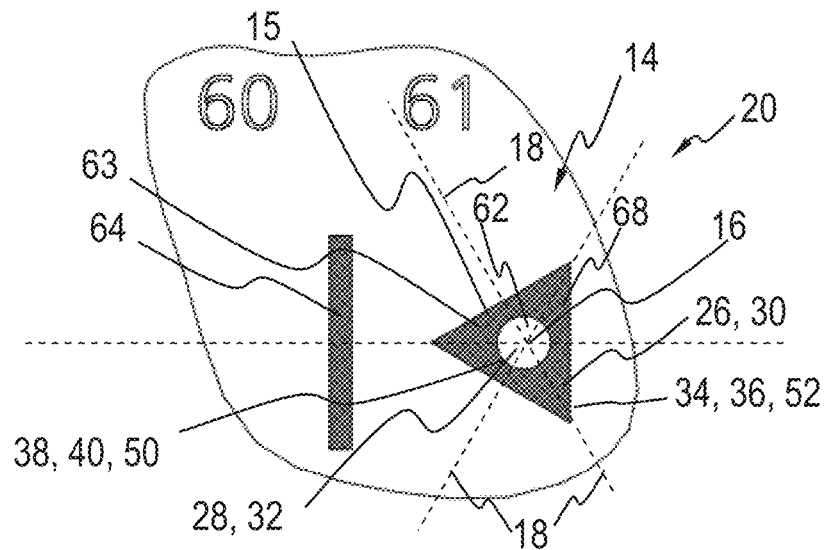
FIG. 5C shows a magnified portion of a further first arrangement of the standard of FIGS. 1A and 1B.
Figure 6A:
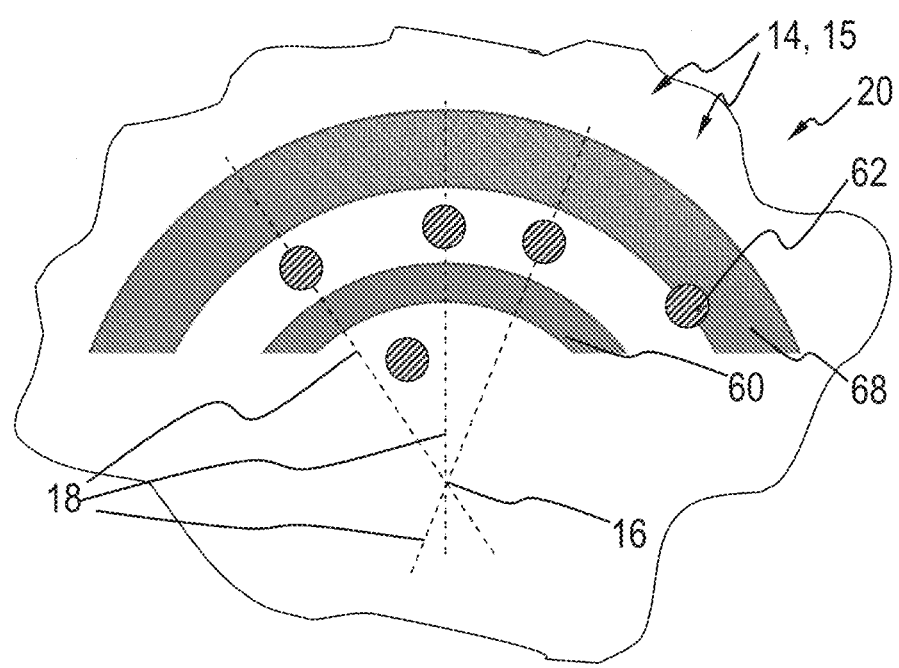
FIG. 6A shows an illustration of a first arrangement of a further example embodiment of the novel standard.
Figure 6B:
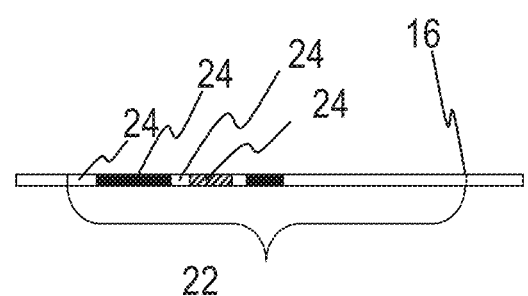
FIG. 6B shows an illustration of a first portion of the first arrangement illustrated in FIG. 6A.
Figure 7A:
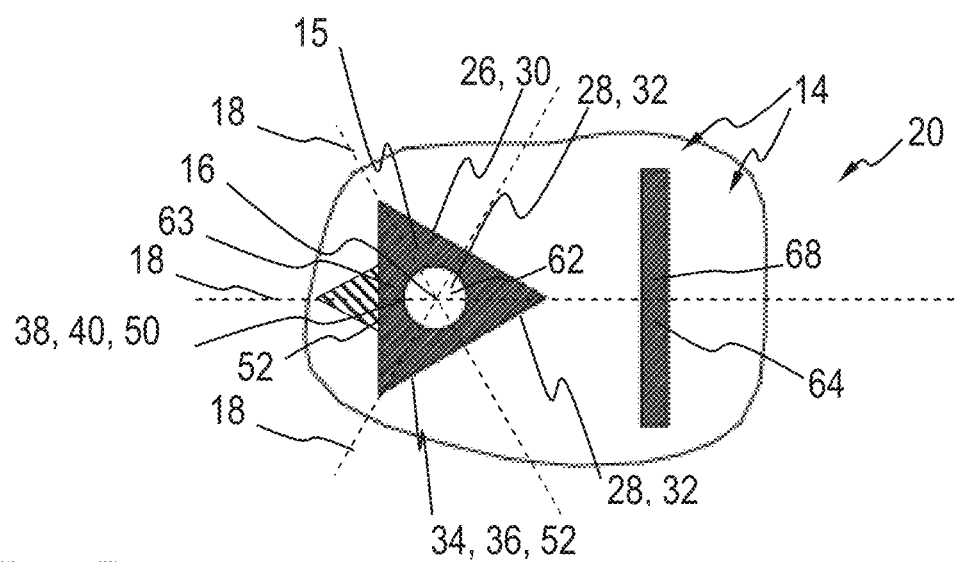
FIG. 7A shows an illustration of a first arrangement of a further example embodiment of the novel standard.
Figure 7B:
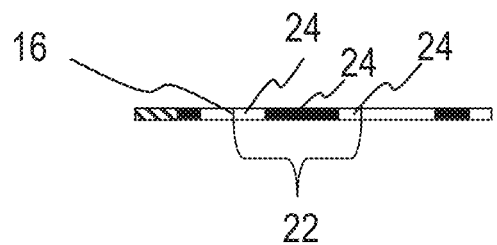
FIG. 7B shows an illustration of a first portion of the first arrangement illustrated in FIG. 7A.
Figure 8:
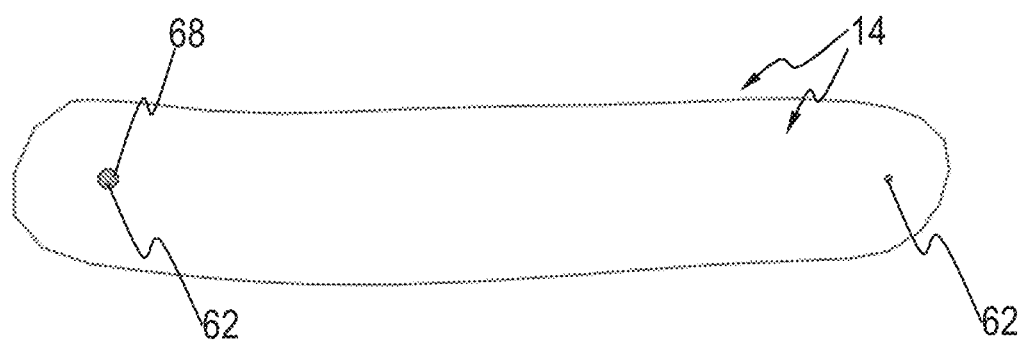
FIG. 8 shows a magnified portion of a part of the calibration structure of the standard of FIGS. 1A and 1B.

The main body 12 can be transparent. The calibration structure 14 may comprise one or more structures selected from a structure group comprising a circle 50, as illustrated in FIGS. 2A, 3A, 5A, 5C, 6A, 7A, 8, 10, 11 and 12, concentric circles 50, as illustrated in FIGS. 2A and 3A, a segment 60, as illustrated in FIG. 6A, a point 62, as illustrated in FIGS. 6A, 2A, 3A, 5A, 5C, 7A, 8, 10, 11 and 12, a triangle 52, as illustrated in FIGS. 5A, 5C, 7A, 10 and 12, a triangular ring 63, as illustrated in FIGS. 5A, 5C and 7A, a rectangle 64, as illustrated in FIGS. 4A, 5A, 5C, 7A, 9, 10, 11 and 12, parallel rectangles with constant spacings 66, as illustrated in FIG. 9, a grid structure, a point grid and a periodic structure, as illustrated in FIG. 9.

The main body 12 can essentially consist of a material selected from the group of materials comprising glass, quartz glass and ZERODUR®. The optical property, in particular the first optical property 30 and/or the second optical property 32, can be selected from a group of optical properties comprising a reflectance, an absorbance, a transmittance and a refractive index. In the Figures, different optical properties are represented by white areas and differently hatched areas and by black areas. By way of example, a hatched area may represent a highly reflective area. By way of example, a white area, a hatched area and a black area may have different absorbances and/or transmittances and/or reflectances.

The calibration structure 14 may have a highly reflective chrome structure 68, in particular. By way of example, the black areas and/or hatched areas in the Figures may be areas embodied as highly reflective chrome structures 68 on the main body 12. By way of example, white areas in the Figures may indicate areas that have no highly reflective chrome structure 68. By way of example, white areas in the Figures may represent a surface of the main body 12. The structures illustrated in FIGS. 2A, 3A, 4A, 5A, 5C and 9 may have, in particular, exactly two different optical properties. The calibration structures 14 that are illustrated in FIGS. 6A and 7A may have, for example, areas with three different optical properties, which are represented by white areas and areas with different hatching. The calibration structure 14 can have an edge steepness of at least 70°, preferably at least 80°, particularly preferably at least 85°.

The standard 10 can have a length of 330 mm. On the basis of their optical property, the n zones 24 can be subdivided into m groups of the same optical property. The first arrangements 15 illustrated in FIGS. 6A and 7A have three groups of the same optical property. The remaining illustrated parts of calibration structures 14 have exactly two groups of the same optical property. The sum of n and m is greater than or equal to 5, preferably greater than or equal to 6, particularly preferably greater than or equal to 7.

By way of example, the standard 10 may comprise a first scale, wherein the first scale may have 30 lines. In principle, the first scale may also have more or fewer lines. Each line has two opposing edges. The edges of the first scale are numbered from 0 to 59. The standard 10 may comprise a second scale. The second scale may likewise comprise lines with opposing edges. By way of example, the edges may be numbered from 60 to 119.

The standard 10 may comprise two first arrangements 15 with concentric circles 50, as illustrated in FIGS. 1A, 1B, 2A and 3A, for example. In the case of the concentric circles 50 illustrated in FIG. 2A, a diameter of the outermost concentric circle may be 10 mm±0.001 mm. In the concentric circles 50 illustrated in FIG. 3A, a diameter of the largest concentric circle may be 5 mm±0.001 mm. As illustrated in FIGS. 2B and 3B, the zones 24 of the first region 26 can have different widths.

The three first arrangements 15 shown in FIG. 4A are preferably configured to calibrate the coordinate measuring machine in respect of different angles 72. The calibration structure 14 may comprise stripe-shaped markers 70, in particular. The stripe-shaped markers 70 can have different angles 72 with respect one another. In each of the first three arrangements 15, three rectangular elongate markers 64 are disposed at different angles 72 with respect to one another. In the left first marker arrangement 15, a second marker forms an angle of 3° with a first marker and a third marker forms an angle of 10° with the first marker. In the central first arrangement 15, the first marker forms an angle of 30° with the first marker of the left first arrangement 15. The second marker of the central first arrangement 15 forms an angle of 45° with the first marker of the left first arrangement 15 and the third marker of the central first arrangement 15 forms an angle of 60° with the first marker of the left first arrangement 15. In the first arrangement 15 disposed on the right, the first marker forms an angle of 80° with the first marker of the first arrangement 15 disposed on the left. The second marker of the first arrangement 15 disposed on the right forms an angle of 87° with the first marker of the first arrangement 15 disposed on the left. The third marker of the first arrangement 15 disposed on the right is at an angle of 90° with respect to the first marker of the first arrangement 15 disposed on the left.

FIGS. 5A and 5C show triangular ring-shaped markers 63, which, with a tip, each point at a rectangular marker 64. The triangle 52 can preferably be an equilateral triangle 52. A base of the equilateral triangle 52 can be aligned parallel to the rectangular marker 64. By way of example, the first arrangements 15 according to FIGS. 5A and 5C can be used to align the standard 10 relative to the coordinate measuring machine. The tip of the triangle 52 pointing in the direction of the rectangular marker 64 in each case points at an end of the standard 10. The rectangular markers 64 can be the first or the last marker of the scales. The structures illustrated in FIGS. 10, 11 and 12 can likewise be usable for aligning the standard 10 relative to the coordinate measuring machine.

The standard 10 in FIGS. 1A and 1B has, in particular, a plurality of first arrangements 15, for example eight first arrangements, and a second arrangement 57. Three of the first arrangements 15 can be used for arranging the standard 10 relative to the coordinate measuring machine. Three further first arrangements 15 can be used for calibrating angles 72. As a result of this, a comprehensive calibration of the coordinate measuring machine can be performed by means of only one standard 10. As used herein, the phrase at least one of A, B, and C should be construed to mean a logical (A OR B OR C), using a non-exclusive logical OR, and should not be construed to mean "at least one of A, at least one of B, and at least one of C."

What is claimed is:
1. A standard for calibrating a coordinate measuring machine, the standard comprising:
   a main body; and
   a permanent calibration structure including a plurality of calibration arrangements, wherein the plurality of calibration arrangements includes:
      a first arrangement including a plurality of adjacent zones along at least three different axes that intersect at a common point, wherein:

the plurality of adjacent zones along each axis of the at least three different axes form a respective portion of the first arrangement delimited by the common point on one side, each axis of the at least three different axes runs over a respective portion, and the respective portions each have at least three adjacent zones including at least two directly adjacent zones that differ in at least one optical property; and a second arrangement including a first set of elongated rectangular markers whose longitudinal axes converge at a first convergence point, wherein:

the first set of elongated rectangular markers includes a first elongated rectangular reference marker, a second elongated rectangular reference marker, and a third elongated rectangular reference marker, and a first angle between the first elongated rectangular reference marker and the second elongated rectangular reference marker is different than a second angle between the third elongated rectangular reference marker and the first elongated rectangular reference marker.

2. The standard of claim 1, wherein:

the plurality of adjacent zones includes:

a first zone having a first geometric shape and a first optical property, and a second zone having a second geometric shape and a second optical property that is different from the first optical property, and the first geometric shape is concentric with the second geometric shape.

3. The standard of claim 2, wherein the first geometric shape and the second geometric shape are selected from a group of shapes consisting of a circle, a triangle, and a rectangle.

4. The standard of claim 1, wherein the main body is transparent.

5. The standard of claim 1, wherein the permanent calibration structure includes one or more structures selected from a structure group consisting of a circle, concentric circles, a segment, a point, a triangle, a triangular ring, a rectangle, parallel rectangles with constant spacings, a grid structure, a point grid, and a periodic structure.

6. The standard of claim 1, wherein the main body essentially consists of a material selected from a group of materials consisting of glass, quartz glass, and lithium-aluminosilicate glass-ceramic.

7. The standard of claim 1, wherein the at least one optical property is selected from a group of optical properties consisting of a reflectance, an absorbance, a transmittance, and a refractive index.

8. The standard of claim 1, wherein the permanent calibration structure includes a highly reflective chrome structure.

9. The standard of claim 1, wherein the permanent calibration structure has an edge steepness of at least 70°.

10. The standard of claim 1, wherein:

the plurality of calibration arrangements includes a third arrangement including rectangular markers and gaps disposed between the rectangular markers;

the rectangular markers are aligned parallel to one another; and the gaps between the rectangular markers are as wide as the rectangular markers.

11. A standard for calibrating a coordinate measuring machine, the standard comprising:

a main body; and a permanent calibration structure disposed on the main body, wherein the permanent calibration structure includes:

a first arrangement configured in such a way that three axes of a projection of the first arrangement on a plane each run over identically configured portions, wherein:

the three axes intersect at a common point, the identically configured portions each are delimited by the common point on one side, the identically configured portions each have n zones, n is greater than or equal to 3, and directly adjacent zones differ in an optical property; and a second arrangement including a first set of elongated rectangular markers whose longitudinal axes converge at a first convergence point, wherein:

the first set of elongated rectangular markers includes a first elongated rectangular reference marker, a second elongated rectangular reference marker, and a third elongated rectangular reference marker, and a first angle between the first elongated rectangular reference marker and the second elongated rectangular reference marker is different than a second angle between the third elongated rectangular reference marker and the first elongated rectangular reference marker.

12. The standard of claim 11, wherein n is greater than or equal to 7.

13. The standard of claim 11, wherein n is greater than or equal to 11.

14. The standard of claim 11, wherein n is greater than or equal to 13.

15. The standard of claim 11, wherein the first arrangement is configured in such a way that more than three axes of the projection of the first arrangement on the plane run over identically configured first portions.

16. The standard of claim 11, wherein:

the permanent calibration structure includes:

a first region having a first outermost boundary line and a first optical property, and a second region having a second outermost boundary line and a second optical property different from the first optical property, the first region defines a first geometric shape, the second region defines a second geometric shape, and the first geometric shape is concentric with the second geometric shape.

17. The standard of claim 16, wherein the first geometric shape and the second geometric shape each are selected from a group of shapes consisting of a circle, a triangle, and a rectangle.

18. The standard of claim 11, wherein:

based on their respective optical properties, the n zones are grouped into m groups having an optical group property, and a sum of n and m is greater than or equal to 5.

19. The standard of claim 11, wherein:

the permanent calibration structure includes a third arrangement including a straight line;

a first straight portion of the straight line has a same length as a second straight portion of the straight line;

the first straight portion is delimited by boundary points of a first sector;

the second straight portion is delimited by boundary points of a second sector; and an optical property of the first sector differs from an optical property of the second sector.

20. A standard for calibrating a coordinate measuring machine, the standard comprising:

a main body; and a permanent calibration structure with a plurality of calibration arrangements, wherein the plurality of calibration arrangements includes:

a first calibration arrangement including a plurality of adjacent zones along at least three different axes that intersect at a common point, wherein:

the plurality of adjacent zones along each axis of the at least three different axes form a respective portion of the first calibration arrangement delimited by the common point on one side, each axis of the at least three different axes runs over a respective portion and the respective portions each have at least three adjacent zones including at least two directly adjacent zones that differ in at least one optical property, and the first calibration arrangement includes a first zone have a first geometric shape and a second zone having a second geometric shape concentric with the first geometric shape; and a second calibration arrangement including a first set of elongated rectangular markers whose longitudinal axes converge at a first convergence point, wherein:

the first set of elongated rectangular markers includes a first elongated rectangular reference marker, a second elongated rectangular reference marker, and a third elongated rectangular reference marker, and a first angle between the first elongated rectangular reference marker and the second elongated rectangular reference marker is different than a second angle between the third elongated rectangular reference marker and the first elongated rectangular reference marker.

21. The standard of claim 20, wherein the first geometric shape and the second geometric shape are different from one another.

22. The standard of claim 21, wherein the first geometric shape is a triangle and the second geometric shape is a circle.

23. The standard of claim 21, wherein:

the plurality of calibration arrangements includes a third arrangement including a plurality of stripe-shaped markers;

the plurality of stripe-shaped markers includes a first stripe-shaped marker and a plurality of further stripe-shaped markers;

each of the plurality of further stripe-shaped markers has a different angle with respect to the first stripe-shaped marker; and the angles of the plurality of further stripe-shaped markers with respect to the first stripe-shaped marker are each within a range from 3° to 90°.

* * * * *